United States Patent [19]
Berg

[11] 3,821,906
[45] July 2, 1974

[54] TRANSMISSION BELT

[76] Inventor: Winfred M. Berg, 89 Grant Ave., E. Rockaway, N.Y. 11518

[22] Filed: Nov. 6, 1972

[21] Appl. No.: 303,982

Related U.S. Application Data

[63] Continuation-in-part of Ser. No. 195,972, Nov. 5, 1971, abandoned.

[52] U.S. Cl. .............................................. 74/246
[51] Int. Cl. ............................................ F16g 13/02
[58] Field of Search ... 74/246, 250 R, 231 P, 231 C

[56] References Cited
UNITED STATES PATENTS

| | | |
|---|---|---|
| 2,613,546 | 10/1952 | Jorgensen .......................... 74/246 |
| 3,394,608 | 7/1968 | Johnson ............................ 74/246 |
| 3,580,647 | 5/1971 | Richards .......................... 74/231 P |
| 3,713,347 | 1/1973 | Atwell ............................. 74/231 P |
| 3,719,100 | 3/1973 | Myers .............................. 74/246 |

*Primary Examiner*—Leonard H. Gerin
*Attorney, Agent, or Firm*—Edward Halle, Esq.

[57] ABSTRACT

A transmission belt for use with sprockets and gears featuring an elongated body portion comprising: at least one cable or the like, with a soft plastic jacket or covering, and a series of transmission pins being generally perpendicular to the cable in which the diameter of the pins is greater than the outside diameter of the cable.

32 Claims, 33 Drawing Figures

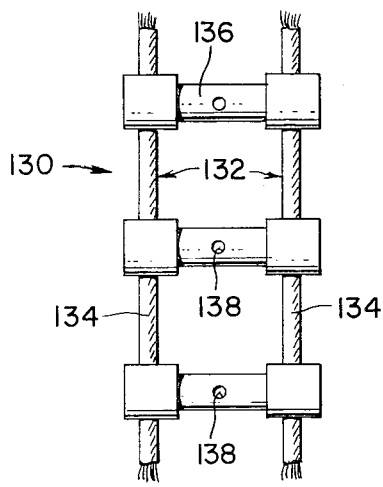
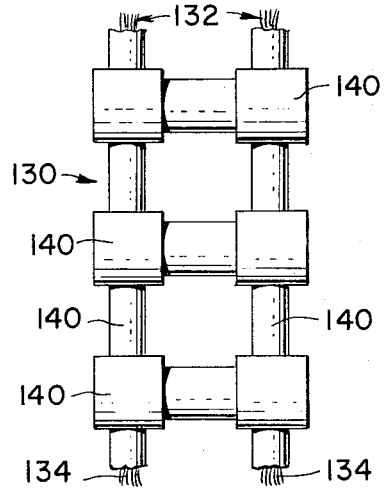
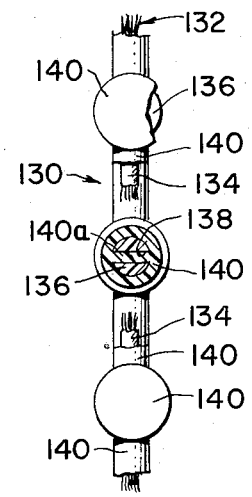
Fig. 17    Fig. 18    Fig. 19
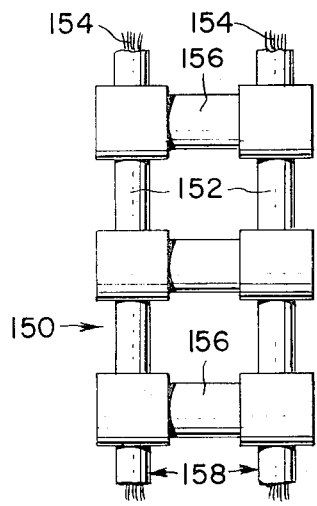
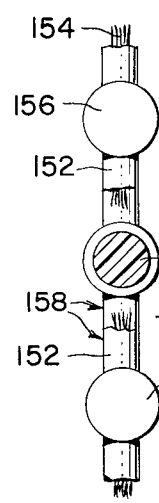
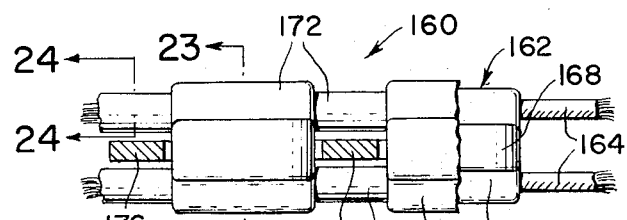
Fig. 20    Fig. 21    Fig. 22
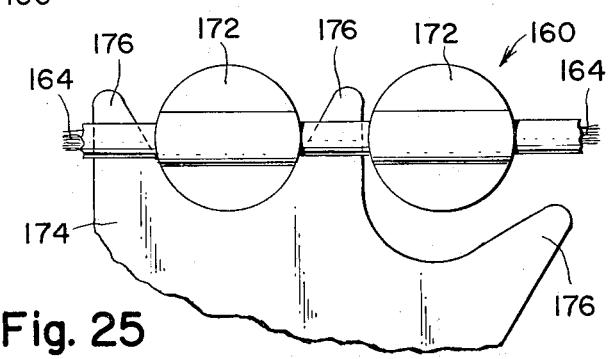
Fig. 25
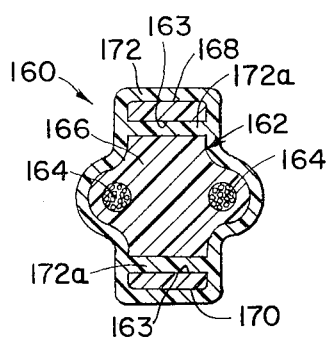
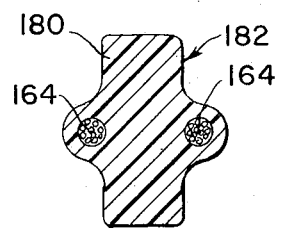
Fig. 23    Fig. 24    Fig. 26

TRANSMISSION BELT

SUMMARY OF THE INVENTION

This invention relates to transmission drive belts generally used in connection with sprockets or gears.

It is an object of this invention to provide a positive drive transmission belt with no slip, which has great cable strength. It is another object of this invention to provide such a transmission belt which requires no lubrication and eliminates linkage backlash, as well as backlash in the drive system.

Still another object of this invention is to provide such a transmission belt which has a silent drive.

A further object is to provide a transmission belt sufficiently flexible to drive in a system having a plurality of axes, for example from a vertical sprocket to a horizontal, to a vertical sprocket to an obliquely held sprocket, and so on. Such a belt would have the further advantage of being usable on parallel shafts for direct drive or a reverse drive by crossing the belt and such a belt would be suitable for use with elliptical gears and drives. Another object in providing a flexible belt is to provide a drive link between sprockets which need not necessarily be in exact alignment.

A further object is to provide a transmission belt which provides positive drive from either side of the belt, top or bottom, and which may be used in rack and pinion arrangement. Further objects and advantages will appear in the specification hereinbelow.

DETAILED DESCRIPTION OF THE INVENTION

Figure 1:
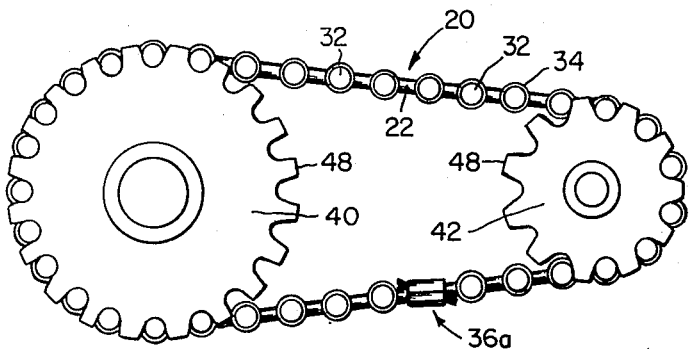
Figure 2:
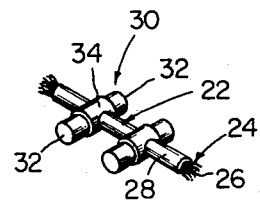
Figure 4:
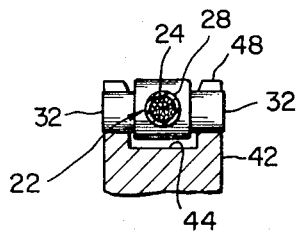
Figure 5:
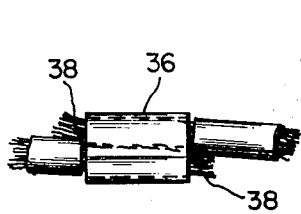
Figure 3:
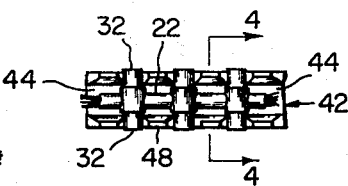
Figure 6:
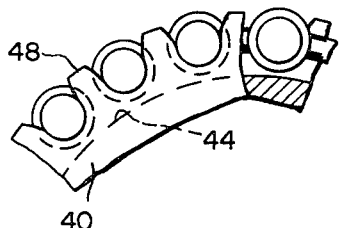
Figure 7:
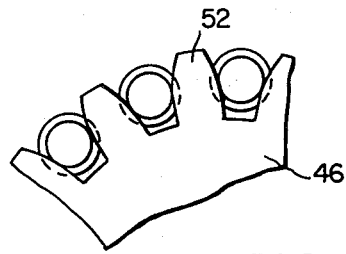
Figure 8:
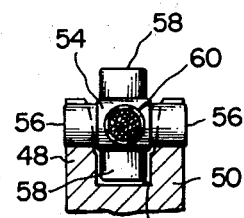
Figure 9:
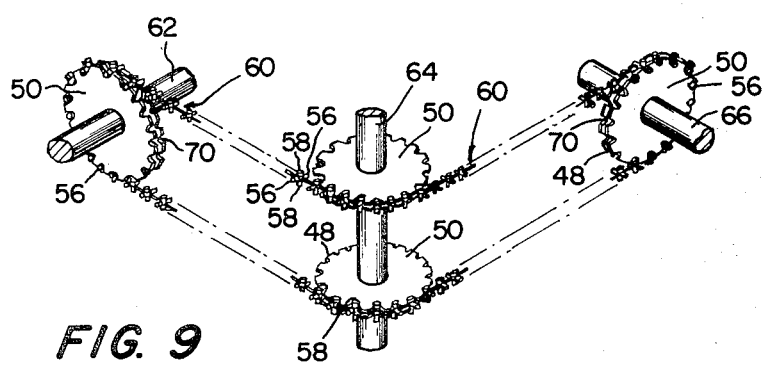
Figure 10:
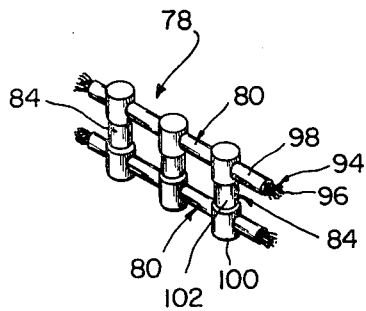
Figure 11:
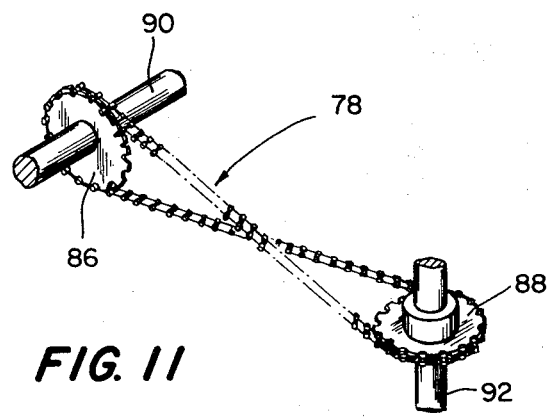
Figure 12:
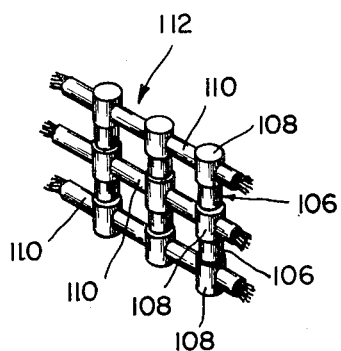
Figure 14:
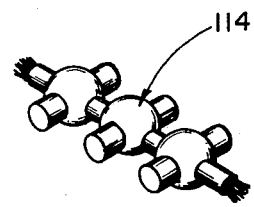
Figure 15:
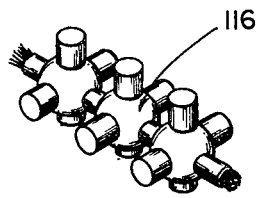
Figure 13:
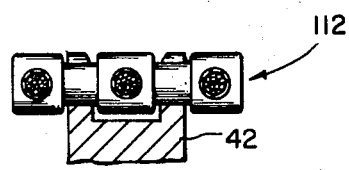
Figure 16:
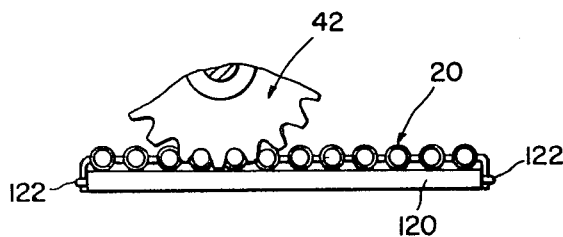
Figure 27:
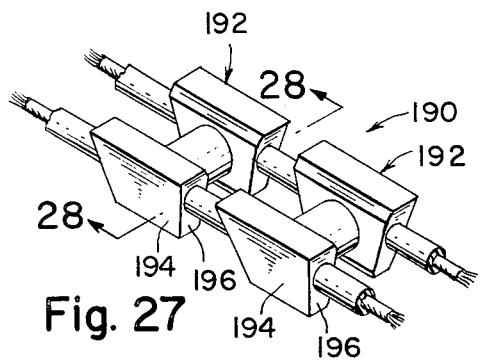
Figure 28:
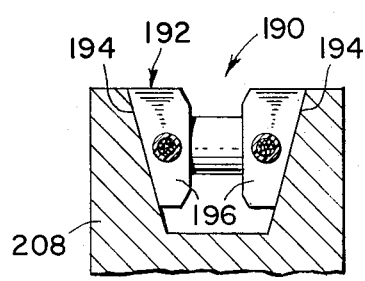
Figure 29:
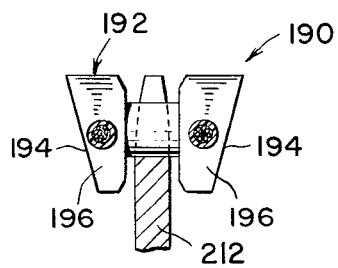
Figure 30:
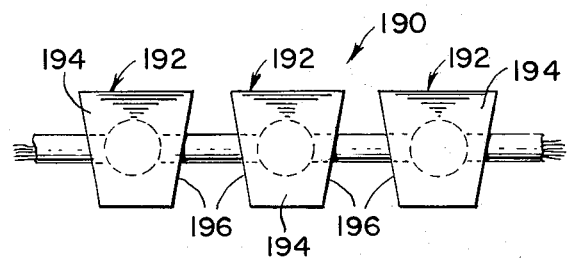
Figure 31:
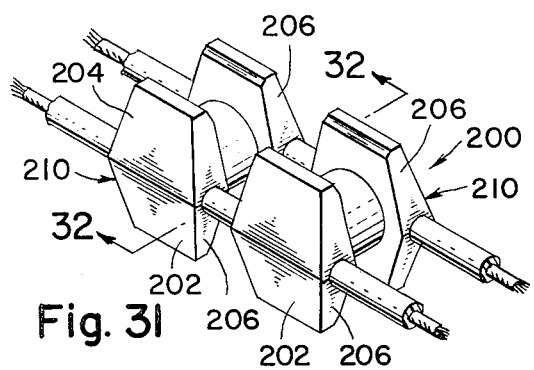
Figure 32:
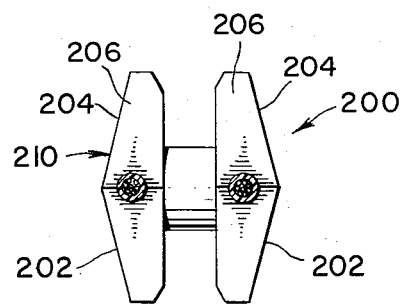
Figure 33:
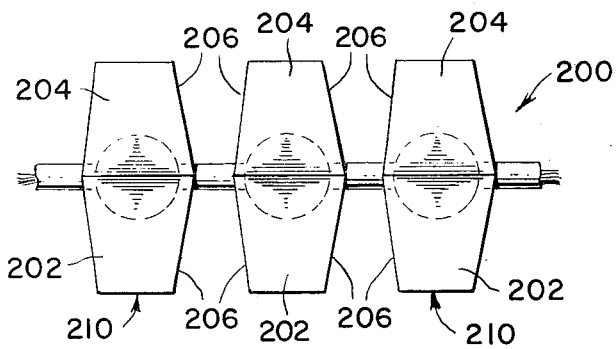

The invention is illustrated in the accompanying drawings in which:

FIG. 1 is an elevational view;
FIG. 2 is a perspective view of a portion of the belt of FIG. 1;
FIG. 3 is a top plan view of a portion of the belt as shown in FIG. 1;
FIG. 4 is an enlarged sectional detail along the lines 4—4 of FIG. 3;
FIG. 5 is an enlarged elevational detail comprising cable connecting means of the invention;
FIG. 6 is an enlarged elevational detail showing a portion of a belt of the invention meshed in a sprocket, parts of which are in section and parts of which are cut away;
FIG. 7 is an enlarged elevational detail of a gear meshed with a portion of a belt of the invention with parts cut away;
FIG. 8 is a view similar to FIG. 4 illustrating in enlarged detail a second form of transmission belt of the invention;
FIG. 9 is a perspective view showing the belt of FIG. 8 of the invention applied to sprockets on three different axes;
FIG. 10 is a perspective view of a portion of a belt illustrating a third form of the invention;
FIG. 11 is a perspective view showing the belt of FIG. 10 applied to a pair of sprockets in different axes;
FIG. 12 is a view similar to FIG. 10 showing a fourth form of the invention;
FIG. 13 is a view similar to FIG. 4 illustrating the form of belt shown in FIG. 12 meshed in a sprocket;
FIG. 14 is a perspective view illustrating a belt as in the first form of invention modified by having a spherical collar formation;
FIG. 15 is a perspective view illustrating the second form of invention modified by having a spherical collar;
FIG. 16 is an elevational view of a form of invention showing the belt and sprocket of the invention in a rack and pinion arrangement;
FIGS. 17 and 18 are top plan views;
FIG. 19 is an elevational view of the belt shown in FIGS. 17 and 18 with parts cut away;
FIG. 20 is a top plan view;
FIG. 21 is an elevational view of the belt shown in FIG. 20 with parts cut away;
FIG. 22 is a top plan view with parts cut away;
FIG. 23 is a sectional view along the lines 23—23 in FIG. 22;
FIG. 24 is a sectional view along the lines 24—24 in FIG. 23;
FIG. 25 is an elevational view of the belt shown in FIG. 22;
FIG. 26 is a cross sectional view;
FIG. 27 is a perspective view;
FIG. 28 is a sectional view along the lines 28—28 of FIG. 27 in combination with a section through a V-belt pulley with parts cut away;
FIG. 29 is a sectional view along the lines 28—28 of FIG. 27 in combination with a sprocket tooth partly in phantom and partly in section and partly cut away;
FIG. 30 is an elevational view of the belt shown in FIG. 27;
FIG. 31 is a perspective view;
FIG. 32 is a section along the lines 32—32 in FIG. 31; and
FIG. 33 is an elevational view of the belt shown in FIG. 31.

Similar numerals refer to similar parts throughout the several views.

The main body portion of the invention as shown in belt 20 comprises at least one elongated flexible body element 22 which, in turn, comprises a central cable 24 made up of multiple strands 26 of twisted steel, wire or other suitable material. A plastic jacket 28, preferably of soft flexible grade plastic such as polyurethane, or any other suitable material, is extruded around the cable by any of the well known means known to the art. After the body of the belt 20 is completed, transmission pin means in assemblies 30 comprising pins 32 are molded to the body portion of the belt 20, being spaced at desired intervals.

The transmission pin means assemblies 30 are made of a hard plastic provided by injection molding operation or operations well known to the art. It has been found that the use of hard material or soft material in combination to provide a transmission belt 20 of the foregoing description and construction has many advantages, as aforesaid.

A principal advantage is the great flexibility of the body portion 20 which is limited only by the proximity of the rigid pin assemblies 30, permitting the use of the belt 20 on extremely small sprockets. The hard and soft material constructions provide means for firmly fixing the transmission pin means assemblies 30 to the body portion 20.

The pins 32 extend generally perpendicularly from the body portion 20, and in the first form of construction shown in FIGS. 1 through 4 of the drawings, are molded integrally with the collar-like portion 34 from which the pins 32 extend.

Cable connection means such as a bushing 36 made preferably of steel, but of any other suitable material, are shown in FIG. 5 of the drawings. The cable connecting means is provided to close the belt 20 into an endless loop. It is placed around the ends 38 of cable 24 and crimped to make a fast connection. The crimped bushing 36 of the connection means may be finished off by molding a pin assembly 30 (not shown) over it, or the bushing 36 may be placed in the space between two pin assemblies 30, or it can take up the space of a pin assembly 30 skipping a space of one pin assembly 30 at the connection point 36a as in FIG. 1. Since an average of 180° of each sprocket are contacted by pin assemblies 30, skipping one set of pins 32 of the series will have no effect.

The outside diameter of the pins 32 is greater than the outside diameter of the body portion of the belt 20, as can be seen in FIG. 4. This has the advantage of permitting greater flexibility around small sprockets than would be possible with pins of narrow diameter affixed to a body portion of greater diameter. Placing the pins 32 in an extremely flexible belt 20 provides the advantage of extreme flexibility in all directions. Representation of the flexing ability of belts made in accordance with the invention can be gained from views of FIG. 9 and FIG. 11 of the drawings.

The belt 20 of the first form of the form of the invention is shown with a pair of sprockets 40 and 42 adapted for use with the invention. These may be any type of conventional sprockets being provided with a radial groove 44 along the pitch line of the transmission belt 20. The groove 44 cuts through the teeth 46 and into the bodies of the sprockets 40, 42 and 50 of the invention to provide room for the belt. Although the term "sprockets" is used herein, it is to be understood that the conventional gears 46 with teeth 52 may also be used in the invention with the provision of radial grooves such as grooves 44 or 70, or the like.

A second form of the invention is illustrated in FIGS. 8 and 9 of the drawings. In this form of invention pin assemblies 54 comprise two pairs of pins 56 and 58 which are normally perpendicular to the belt 60 and to each other so that the belt 60 may run from a sprocket 50 with a horizontal axis 62 to and around a sprocket 50 with a vertical axis on shaft 64, to and around a sprocket 50 on a horizontal shaft 66, back to a sprocket 50 on shaft 64 and around sprocket 50 on shaft 62 again. This forms a drive through three axes X (62), Y (64Z), and Z (66) with no twisting of the belt 60, thus permitting operation through various angles without multiple gearing, and costly shaft assemblies. The groove 70 of sprocket 50, as shown in FIG. 8, will be relatively deeper than the groove 44 of sprocket 40 and 42 shown on 42 in FIG. 4 in order to accommodate the "off" pair of pins ("in the" 56 or 58) as they pass through the pitch line of the sprocket 50.

Reference to FIG. 9 will show that as the belt 60 passes around the sprockets 50 sometimes the pin 56 will be meshing with teeth 48, while pins 58 are "off" sprocket in groove 70 (as in sprockets 50 on shafts 62 and 66) and sometimes pins 56 will be "off" sprocket while pins 58 will be "on" sprocket (as in sprockets 50 on shaft 64). In this form of the invention the pins 56 and 58 extend radially from the belt 60 with the radius of each pin being an equal distance apart. The form illustrated shows radii equidistant at right angles to each other.

In FIGS. 10 and 11 a third form of invention is shown in which a pair of elongated flexible body elements 80 are connected by pin assemblies 84. Such a belt 78 will be flexible enough to connect two sprockets 86 and 88 rotating in perpendicular planes on shafts 90 and 92 with axes perpendicular to each other.

The pin means assemblies 84 are of the same type of hard plastic construction of the mentioned forms of the invention and the body member 80 is similar to body member 22 which has the soft plastic coating, or jacket 28. The body members 80 comprise a similar central cable 94 of strands 96 covered by a similar soft plastic jacket 98. The pin means assemblies 84 are of hard plastic molded over the soft plastic of the jackets 98, and have collar portions 100 between which the pins 102 extend laterally. With this type of pin 102 the sprockets may be used with or without the radial groove 44.

A fourth form of invention is shown in FIGS. 12 and 13. In this form all of the elements are constructed similarly to the previous forms except that the pin assemblies 106 have three collar portions 108, each molded to a flexible elongated body portion 110 to form a three strand belt 112 which is adapted for use with a sprocket 42 as shown in FIG. 13.

In FIGS. 14 and 15 pin assemblies of the first and second forms of the invention are shown with spherical collars 114 and 116, respectively. Any form of the invention can be made with collars in the form of a round ball or sphere. It has been found that such a construction has the advantage of smoother running qualities especially where tolerances within grooves such as grooves 44 are concerned.

Another form of the invention is shown in FIG. 16 in which a rack base 120 is provided with a length of belt of the invention such as belt 20. The belt length 20 is fixed to the base by staples 122 or other fastening means. This forms the "rack". A sprocket 42 of the invention may be used for the "pinion" construction.

Again the term "sprocket" is used herein to cover both conventional sprockets and conventional gears, since the hard plastic pins of the invention will adapt to either sprockets or gears in any form of the invention.

FIGS. 17, 18 and 19 show a belt 130 which is substantially similar in appearance and function to the belt 78 shown in FIGS. 10 and 11. Belt 130 is constructed from a pair of body members 132, each comprising a central cable 134 preferably made of multiple strands of twisted steel wire or other suitable material similar to cable 26. The pin assemblies 136 are molded around the cables 134 as shown in FIG. 17. The pin assemblies 136 whether made of metal or plastic should be rigid after they are positioned on the cables.

Each pin assembly 136 comprises an opening 138 which may be a through opening. The pin means assembly 136 may be made of a hard or soft plastic as desired and they may also be made from metal which can be cast and molded to the desired shape around the cables 134. Thus pin assemblies 136 as illustrated in FIG. 17 may be made of either plastic or metal. The particular molding operation is not described because any molding operation known to the art for use with either plastic or metal may be employed.

Belt 130 is finished by flowing a coating 140 of plastic such as a flexible polurethane over the cables 134 and the mounted pin assemblies 136. The coating 140 provides a continuous integral coating over all of the elements of belt 130, as illustrated in FIG. 18. In FIG. 18 the reference numeral 140 is placed on each element of the belt 130 which has the continuous plastic coating 140.

Reference to FIG. 19 will show a side elevation of the belt 130 with parts cut away. For example, the transmission pin assembly 136 has part of the coating 140 over it cut away. A part of cable 134 has the coating 140 cut away from it and the central pin has been cut right through the middle to show that the plastic coating 140 will not only serve as a continuous coating for the belt 130 but will also flow through the opening 138 to provide a finger or fingers 140a which will positively grip each transmission assembly 136 and help to hold it in its relative position.

In FIG. 20 of the drawings a belt 150 is shown, which is substantially similar in appearance to belt 130. Belt 150 is made by molding a plastic cover 152 over the cables 154. The plastic covering 152 is molded in such a way that transmission pin assemblies 156 are molded integrally into the material of the cover so that the belt 150 will have the appearance as shown in FIGS. 20 and 21.

The cables 154 will thus be covered by the plastic covering 152 and will conform to the shape of the cables 154 and form body members 158 which include the cable 154 as well as pin assemblies 156 which, although integral with the covering 152, will, nevertheless, have the shape of transmission pins as shown. The covering 152 with its portions 158 and 156 may be molded over the cables 154 out of a flexible polyurethane or other suitable plastic by any molding means known to the art.

In FIG. 21 a side elevation of belt 150 is shown with parts cut away to show a section of the center transmission pin 156. This section is made of one piece plastic material integral with covering portions 15. Actually in this form of cable there are really only two materials, first, the cable 154 itself and, second, the plastic material of the covering 152 and its portions 156 and 158.

In FIGS. 22 through 24 a transmission cable 160 is shown which has large diameter pin assemblies 152. Belt 160 may be made in the same way as belt 150. A pair of cables 164 are lined up in parallel relationship and a series of transmission assemblies 162 of either plastic or metal may be molded over the cables in the same manner as assemblies 136 are molded over cables 134. In the case of belt 160, the central portion 166 of the pin assembly 162 is made with a very large diameter relative to the diameter of the cables 164. Reference to FIG. 23 will show this relationship in cross section. The diameter which is measured between the top 168 and the bottom 170 is much greater than the diameter of the cables 164. The belt 160 is finished by flowing a coating 172 over the components as coating 140 is flowed over belt 130.

Reference to FIG. 23 will show the coating 172, which is made of a flexible polyurethane or similar plastic, around a pin assembly 162 and reference to FIG. 24 will show the same coating 172 around a cable portion 164, it being understood that the coating 172 of both figures is part of a continuous integral coating 172 as shown in FIG. 22. Reference to FIG. 22 will show a top plan view of a portion of a belt 160 in which some of the coating 172 has been cut away.

The pin assemblies 162 of belt 160 may be provided with one or more openings 163 (as shown in FIG. 23). Openings 163 may serve as cavities (similar to openings 138) which may be filled with the flowing plastic coating 172 to form grips or fingers 172a integral with coating 172.

Belt 160 is particularly useful in connection with sprockets 174 having relatively long teeth 176 (see FIG. 25). Belt 160 may also be used with a long toothed sprocket such as is commonly found on foot pedalled bicycles.

Belt 160 may also be made in the same manner as belt 160 by molding a plastic coating 180 over the cables 164 having a series of molded portions corresponding to the shape of pin assemblies 156. This is illustrated in FIG. 26 at a section through a pin assembly 182 which is molded in the form of a pin assembly similar to pin assembly 156 during the molding operation in which coating 180 is placed on the cables 164 in the same manner as coating 152 is placed on cables 154, as described above concerning belt 150.

Thus transmission belts have been described in which there may be one or more elongated body elements such as the cables of the invention in combination with transmission pin assemblies of various shapes. In some of the belts the cables are first covered with a soft plastic and transmission assemblies of hard plastic are molded over. In other belts the pin assemblies are molded directly onto the cables of a rigid plastic or metal and are then covered with a flexible plastic, and in other belts the cables are covered with a flexible plastic which also has the transmission pins integrally molded into said cover.

In all of the belts described hereinabove the transmission pin assemblies may be adapted for use with V-belt pulleys as well as sprockets by providing the transmission pin assemblies with ends adapted to fit into V-type pulleys. One example of such a transmission pin assembly is shown in FIG. 27 of the drawing in belt 190. Belt 190 can be made by any method of construction heretofore described. Each transmission assembly 192 comprises a pair of inclined ends 194 adapted to have the outer configuration of a conventional V-belt so as to fit convention V-belt pulleys as illustrated in FIG. 28. The same belt 190 will also drive or be driven by a standard sprocket as illustrated in FIG. 29, or by any other toothed wheel or gears.

In FIG. 30 a side elevation of belt 190 is shown to illustrate that the leading and trailing edges 196 of the pin assemblies 192 are slanted to provide the flexibility of the belt 190 in curving around a sprocket or gear. FIG. 31 illustrates a belt 200 which is identical to belt 150 except that it is provided with a double V-form which may be better seen in the sectional view in FIG. 32. The V 202 form on the bottom of FIG. 32 can be driven over a V pulley and the V-form 202 on the top of FIG. 32 can also be driven over a V-pulley. The advantage of this double V-form is that the belt 200 can be looped around several pulleys in different positions to provide a power train in a formation other than a simple loop.

Such a belt may be used to provide an L shaped loop or a loop of practically any shape as determined by the position of the sprockets or pulleys with which it is used. Reference to FIG. 33 shows a side elevation of belt 190 showing that the leading and trailing edges 206 are inclined to provide for flexing the belt in both upward and downward directions. Thus a sinble V-belt 190 has been described which will work with a V-pulley 208, and a double V-belt 200 having transmission assemblies 210 will also work with such a V-pulley 208.

Belts 190 and 200 are also compatible with sprockets and gears so that they may be used with a system employing V-belt pulleys 208 as well as srpockets 212 or gears. Since the material from which the transmission assemblies 192 or 210 are made can be a flexible plastic, the application of belts 190 and 200 are almost universal. The belts will not only flex into various positions between V-portions of the transmission assemblies and adapt themselves to various pulleys and positions with relation to the pulleys.

While I have described my invention in its preferred forms there are many forms that it may take and I desire to be protected for all forms coming within the scope of the claims hereinbelow.

Wherefore I claim:

1. A transmission belt comprising a flexible elongated body portion comprising at least one elongated cable element on which a series of transmission pin means are positioned, in which the flexible cable element comprises soft flexible plastic cover means over at least one portion of its length to form a portion of at least one elongated body element, and in which the transmission pin means are comprised of elements extending perpendicularly with relation to said cable element with said pin means having a diameter larger than the diameter of the cable where covered by the soft flexible plastic cover means.

2. The transmission belt as claimed in claim 1, in which the transmission pin means are comprised in assemblies of hard plastic, each comprising a pair of transmission pin means extending laterally from opposite sides of said elongated body element.

3. The transmission belt as claimed in claim 2, in which at least one pin assembly comprising a pair of transmission pin means is formed with a hard plastic collar positioned around the elongated body element.

4. The transmission belt as claimed in claim 3, in which the hard plastic collar is molded around the soft plastic of the elongated body element.

5. The transmission belt as claimed in claim 3, in which the hard plastic collar positioned around the elongated body element is spherical and axially positioned around the elongated body element with the pin means extending from said spherical collar.

6. The combination of a transmission belt as claimed in claim 1, with at least one sprocket having a width greater than that of the elongated body element of the belt, having grooved sprocket teeth in which the grooving runs radially.

7. The transmission belt as claimed in claim 1, in which the transmission pins are arranged in at least one transmission pin means assembly comprising a plurality of transmission pin means extending radially on radii equidistant from each other.

8. The transmission belt as claimed in claim 7, in which there are four laterally extending pins at right angles to each other.

9. The transmission belt as claimed in claim 8, in which the transmission pin means assembly comprises a spherical collar positioned around the body element along an axis of the sphere, with the pin means extending from the spherical collar, radially from said axis.

10. The combination of a transmission belt as claimed in claim 8 with at least one sprocket having a width greater than that of the body element of the belt, having grooved sprocket teeth in which the grooving runs radially and deep enough to accommodate the length of a transmission pin means of the belt.

11. The combination as claimed in claim 10 having a plurality of sprockets in which at least one sprocket of the combination rotates in a plane different from the plane in which another sprocket of the combination rotates.

12. The combination as claimed in claim 11, in which at least one sprocket of the combination rotates in a plane substantially perpendicular to a plane in which another sprocket of the combination rotates.

13. The combination of a transmission belt as claimed in claim 9 with at least one sprocket having a width greater than that of the body element of the belt, having grooved sprocket teeth in which the grooving runs radially and deep enough to accommodate the length of a transmission pin means of the belt.

14. A transmission belt as claimed in claim 1 having a pair of elongated flexible body elements with a series of pin means disposed laterally between the body elements.

15. The transmission belt as claimed in claim 14, in which the pin means are comprised in pin assemblies having spherical collar portions molded around the elongated body elements substantially at the axes of said spherical collar portions.

16. A transmission belt as claimed in claim 2 having at least two additional elongated body elements in addition to said first mentioned elongated body element from which the pins extend laterally, said additional body elements being disposed on either side of the belt, said first body element being connected to outward portions of said pin means.

17. The transmission belt as claimed in claim 16, in which the pin means are comprised in pin assemblies having spherical collar portions molded around the elongated body elements substantially at the axes of said spherical collar portions.

18. A rack and pinion arrangement comprising the combination claimed in claim 6, in which at least a portion of the belt is fixed to a pinion base, and the sprocket is meshed to the pin means of the belt.

19. The transmission belt as claimed in claim 1, in which the pins comprise a material which is moldable around the cable element as rigid pins, and the soft flexible plastic cover means forms an integral cover for the flexible cable element and the pins.

20. The transmission belt as claimed in claim 1, in which the pin means are molded from the same material as the flexible plastic cover means and are formed integrally therewith.

21. The transmission belt as claimed in claim 19, in which the pin means are comprised in assemblies having a pair of transmission pin portions extending laterally from opposite sides of said cable element.

22. The transmission belt as claimed in claim 19, having a pair of cable elements and a series of pins having a transmission pin portion disposed laterally between the cable elements.

23. The transmission belt as claimed in claim 19, in which the transmission pin portions have a diameter of more than twice the diameter of a cable element.

24. The transmission belt as claimed in claim 20, in which the transmission pin portions have a diameter of more than twice the diameter of a cable element.

25. The transmission belt as claimed in claim 19 which has rigid pins made of a hard plastic.

26. The transmission belt as claimed in claim 19, which has rigid pins made of metal.

27. The transmission belt as claimed in claim 19, in which at least one rigid pin has at least one opening forming a cavity in which a portion of the soft flexible cover means is positioned.

28. The transmission belt as claimed in claim 27, in which the opening is at least one through opening.

29. The transmission belt as claimed in claim 1, in which the ends of the pin means are slanted to form part of a V-shape.

30. The transmission belt as claimed in claim 14, in which the ends of the pin means are slanted to form part of a V-shape.

31. The transmission belt as claimed in claim 19, in which the ends of the means are slanted to form part of a V-shape.

32. The transmission belt as claimed in claim 20, in which the ends of the pin means are slanted to form part of a V-shape.

* * * * *

Disclaimer 3,821,906.—*Winfred M. Berg,* E. Rockaway, N.Y. TRANSMISSION BELT. Patent dated July 2, 1974. Disclaimer filed Feb. 23, 1984, by the assignee, *Winfred M. Berg, Inc.*

The term of this patent subsequent to July 31, 1990 has been disclaimed.
[*Official Gazette April 17, 1984.*]

UNITED STATES PATENT AND TRADEMARK OFFICE
CERTIFICATE OF CORRECTION

PATENT NO. : 3,821,906
DATED : July 2, 1974
INVENTOR(S) : Winfred M. Berg

It is certified that error appears in the above-identified patent and that said Letters Patent is hereby corrected as shown below:

On the title page under Related U. S. Application Data "abandoned" should read -- Pat. No. 3,748,917 --.

Signed and Sealed this

Seventeenth Day of July 1984

[SEAL]

Attest:

Attesting Officer

GERALD J. MOSSINGHOFF

Commissioner of Patents and Trademarks